United States Patent Office 2,931,154
Patented Apr. 5, 1960

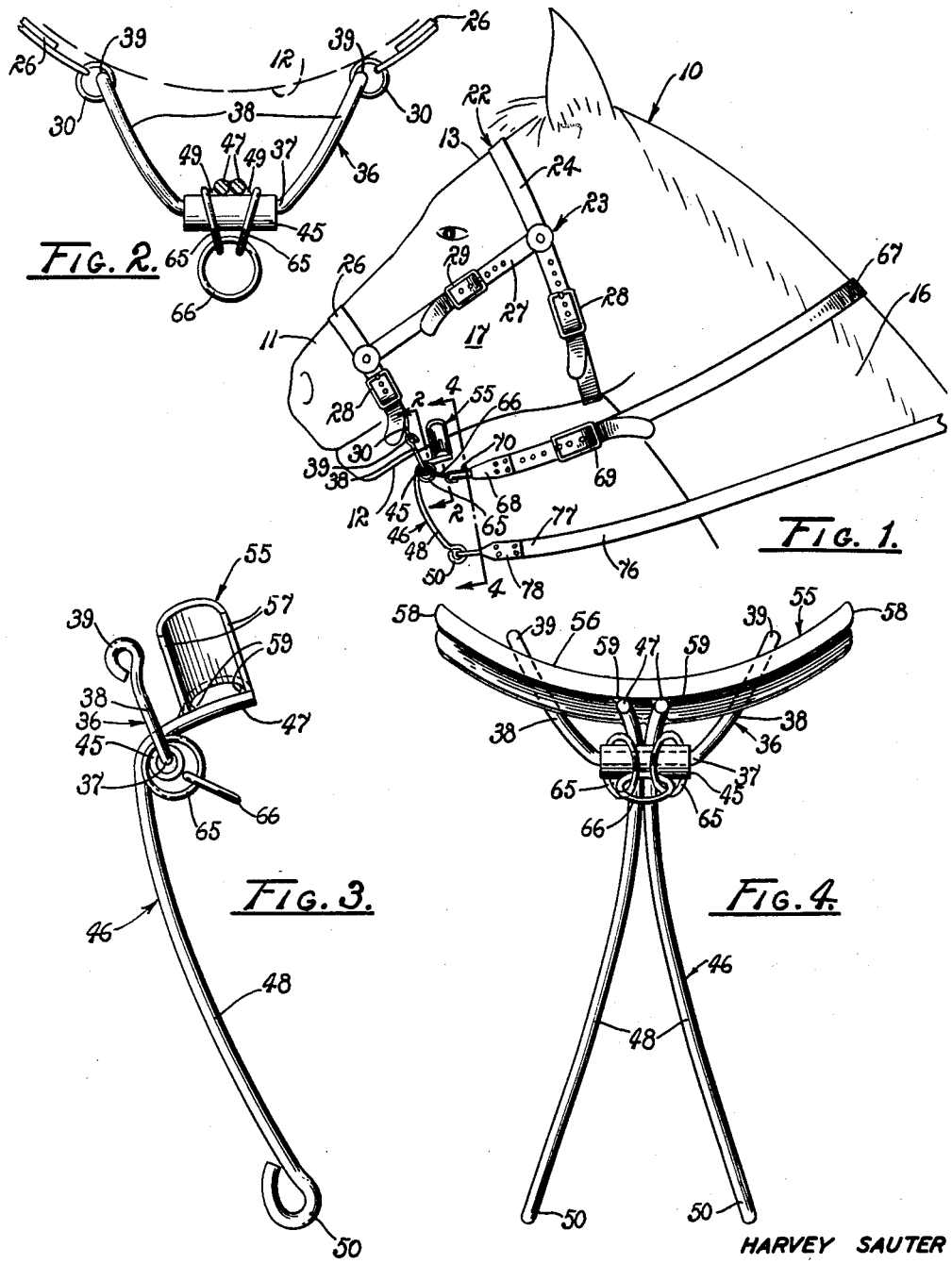

2,931,154

ANIMAL CONTROLLING APPARATUS

Harvey Sauter, Mendota, Calif.

Application July 7, 1958, Serial No. 746,826

3 Claims. (Cl. 54—6)

The present invention pertains to an animal controlling apparatus and more particularly to a chin engaging member and control mechanism therefor adapted for use in a bridle and controllably engageable with the chin or lower jaw of an animal for guiding the animal with a minimum of discomfort to it. In a sense the apparatus is a substitute for a bit.

Proper control of a horse, and some other animals, is essential if the horse is to achieve maximum usefulness whether for pleasure riding, jumping, showing, racing, working, or the like. Control of a horse usually is effected by application and relief of pressure in the mouth or under the chin of the animal through reins held in the hands of the equestrian.

Most commonly, bridles are fitted on the head of a horse and include a bit fitted in the mouth of the animal. If mouth bits are used for breaking and training particularly young horses, the animal may fight the bit, rear upwardly, and attempt to throw the rider. Also, a mouth bit frequently damages a tender mouth and may cause bit sores. Even for training horses with toughened mouths, bits can be uncomfortable and certainly interfere with both drinking and eating.

The utilization of a hackamore, or bitless bridle, was known probably even before the invention of the mouth bit. A hackamore may include a nose strap associated with a bridle and having opposite ends terminating adjacent to the sides of the nose or underneath the chin. Some hackamores provide metal side pieces constituting bell cranks having lower rein end portions, and upper chin end portions pivoted intermediate their end portions to the nose strap, and a chain or strap interconnecting the chin end portions of the side pieces and extended underneath the chin or lower jaw of the horse. The reins, conected to the rein end portions of the side pieces are used to apply pressure to the chin strap by pivoting the bell cranks. Various types of hackamores are known but generally all employ some type of chin engaging member.

Certain of the conventional hackamores exert disproportionately counteracting forces on the horse's head tending to pull the nose downwardly while forcing the jaw upwardly. This is objectionable to an animal, causes it to throw its head, and results in poor control. Other hackamores include parts which rub annoyingly against the lower jaw and cause irritability. Additionally, these bitless bridles are not generally employed, except for training and breaking as above noted, and primarily because their constructions do not permit positive and adequate control of an animal in a manner equivalent to that of a mouth bit.

Accordingly, it is an object of the present invention to facilitate the control and guidance of an animal with a minimum of discomfort and irritation.

Another object is to provide an animal controlling apparatus which enables rapid communication of control signals to the animal's chin or lower jaw from the reins.

Another object is to avoid the use of a mouth bit for controlling and guiding an animal.

Another object is to provide an attachment for incorporation in a bridle which is easy to mount on a horse or other animal.

Another object is to avoid bit fighting, head throwing, and the like, as the result of control apparatus worn on the head of an animal.

Another object is to prevent the formation of bit sores in the mouth of an animal.

Another object is to provide a control apparatus for an animal which can be more dependably attached to the animal than previous devices for the purpose.

Another object is to provide a device for controlling the movements of an animal while permitting eating and drinking.

These, together with other objects, will become more fully apparent upon reference to the following description.

In the drawing:

Fig. 1 is a side elevation of the head of a horse showing a bridle incorporating the animal controlling apparatus of the subject invention.

Fig. 2 is a somewhat enlarged vertical section taken on line 2—2 in Fig. 1 and showing the outline of the lower jaw or chin of the horse's head in dashed lines.

Fig. 3 is a somewhat enlarged side elevation of the subject animal controlling apparatus.

Fig. 4 is a somewhat enlarged vertical section taken on line 4—4 in Fig. 1 but omitting illustration of the horse's head.

Referring more particularly to the drawing, a horse's head 10 is illustrated in Fig. 1 and, for purposes of subsequent reference, provides a nose 11, a chin or lower jaw 12, a forehead 13, a neck 16, and opposite cheeks, as 17.

A bridle 22 includes a headstall or headgear 23 providing a brow band 24 extended over the forehead 13 and underneath the chin 12 adjacent to the neck 16, a nose strap 26 extended over the nose 11 of the horse's head 10 and having opposite end portions terminating on opposite sides of the nose relatively adjacent to the chin, and a pair of cheek straps, as 27, interconnecting the brow band and the nose strap. Preferably, buckles 28 are incorporated in the brow band, and the nose and cheek straps for permitting adjustment of these members. Further, circular eyelets 30 are connected to the terminal ends of the nose strap and are likewise adjacent to the chin of the animal.

The subject control apparatus includes a substantially U-shaped upwardly disposed hanger 36, best seen in Figs. 2 and 4, preferably of rigid metal rod, and having a substantially straight intermediate cylindrical journal portion 37 and a pair of upwardly divergent end portions 38 terminating in hooks 39 individually loosely coupled to the eyelets 30 connected to the nose strap 26. In this manner the hanger is loosely supported from the nose strap and is adapted for swingable movement forwardly and rearwardly of the horse.

A cylindrical bearing sleeve 45 is loosely received on the journal portion 37 of the hanger 36. Elongated, generally L-shaped lever arms 46 include upper chin end portions 47 and arcuate lower rein end portions 48 substantially right-angularly integrally connected to the upper end portions. The bearing sleeve, as mounted on the journal portion of the hanger, has relatively upwardly and downwardly and forwardly and rearwardly disposed portions. The arms are connected, as by welds 49, intermediate their end portions in juxtaposed relation to the upwardly disposed portion of the bearing sleeve so that their upper end portions 47 extend generally rearwardly of the bearing sleeve and their lower end portions extend generally downwardly and rearwardly of the bearing sleeve. It is further to be noted that the upper end portions of the arms diverge rearwardly while the lower end portions diverge downwardly and slightly rearwardly. The lower end portions of the arms terminate in reversely curved hooks 50. So connected together, the arms constitute a lever.

An elongated longitudinal upwardly concave semi-cylindrical chin bar 55 includes an upper transversely convex and longitudinally concave surface 56 and downwardly disposed arcuate longitudinal edges 57, and opposite ends 58. The chin bar extends transversely of the horse's head 10 with the upper surface disposed toward the chin 12 and with the longitudinal edges connected, as by welding 59, to the upper end portions 47 of the lever arms 46 and intermediate the opposite ends 58 of the bar.

A pair of circular mounting rings 65 loosely encircle the bearing sleeve 45 on opposite sides of the lever arms 46. In addition, a circular connecting ring 66 of substantially the same size and shape as the mounting rings encircle the latter so as to be connected thereto. A mounting rein 67 is looped about the neck 16 of the horse 10 and includes a forwardly extended end portion 68. Preferably, a buckle 69 is incorporated in the mounting rein for facilitating adjustment thereof. A snap fastener 70 is attached to the forwardly extended end of the rein and is releasably connected to the ring 66. Thus, the hanger 36 and the nose strap 26 together with the mounting rein 67 support the pivot axis of the arms in desired position underneath the lower jaw 12 and generally forwardly thereof. It will also be understood that the ring 66 may be welded directly onto the sleeve 45, if desired, rather than being mounted by the rings 65 as described.

Further, a pair of handling reins 76 is provided each including a forwardly extended end 77 and rearwardly extended ends, not shown, which are intended to be held in the hands of the equestrian or driver. Snap fasteners 78 are attached to the forwardly extended ends of the handling reins and are releasably connected to the hooks 50 in the lower ends 48 of the lever arms 46.

*Operation*

The operation of the described embodiment of the subject invention is believed to be readily apparent and is briefly summarized at this point.

The bridle 22 is attached to the head 10 of the horse in a well-known manner. The mounting rein 67 is looped around the neck 16 and adjusted by means of the buckle 69. Further, the handling reins 76 are positioned around the neck of the animal in the usual way.

The hooks 39 of the hanger 36 are individually connected to the eyelets 30 so that the chin bar 55 is disposed upwardly with its upper surface 56 in opposed relation to the animal's lower jaw or chin 12 and with the lower ends 48 of the arms extended downwardly. The snap fastener 70 on the mounting rein 67 is then connected to the ring 66. Finally, the snap fasteners 78 on the handling rein 76 are individually connected to the hooks 50. Thus, in this simple manner, the controlling apparatus of the subject invention is connected to the headstall 23 of the bridle 22 and mounted on the horse 10.

In actual use, the handling reins 76 are pulled rearwardly to pivot the arms 46 about the journal portion 37 as an axis whereby the chin bar 55 is moved upwardly into engagement with the lower jaw 12 of the animal. It will be evident that this applies pressure to the animal's jaw and that by controlling the pull on the handling reins, the extent of application of pressure is controlled. It has been found in practice that the animal responds quickly to pressure thusly applied and is readily guided thereby. Although the device is especially useful on a horse, it obviously can be used on other animals, if desired.

It is significant that the subject apparatus avoids the discomforts and inconveniences of a mouth bit. By controlling the movements of the animal by applying pressure to the lower jaw or chin, rather than to the mouth, bit sores and bit fighting are obviated. Still further, an animal can eat or drink without interference by the bit as will be evident. From the foregoing, it will be apparent that the animal controlling apparatus is a highly satisfactory, dependable and humane manner of controlling and guiding the movements of the animal.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. In a bridle for an animal including a headstall adapted for attachment to the animal's head including a nose strap adapted to extend over the animal's nose and having opposite ends adapted to lie on opposite sides of the nose, an animal controlling apparatus comprising eyelets connected to the ends of the nose strap, a substantially U-shaped upwardly disposed hanger having upper hooks individually loosely connected to the eyelets and an intermediate lower journal portion adapted to extend transversely of the animal in spaced relation beneath the animal's chin; a bearing sleeve rotatably received on the journal portion of the hanger and having upwardly and downwardly disposed and forwardly and rearwardly disposed portions; a pair of elongated generally L-shaped lever arms having substantially right-angularly related upper and arcuate lower end portions and being rigidly connected in juxtaposition intermediate said end portions to the upwardly disposed portion of the sleeve so that the upper end portions are rearwardly divergent from the sleeve and so that the lower end portions are downwardly and slightly rearwardly divergent from the sleeve; a pair of mounting rings loosely encircling the sleeve on opposite sides of the arms; a connecting ring loosely encircling the mounting rings; an elongated, longitudinally upwardly concave chin bar adapted to extend transversely of the animal under its chin having upwardly extended opposite outer ends and being rigidly connected intermediate said ends to the upper end portions of the arms, the arms being swingable on said journal portion incident to application and release of rearward pressure on said lower end portions of the arms between a position with the chin bar in engagement with the animal's chin and a position retracted therefrom; a mounting rein fitted around the animal's neck and having a forward end portion attached to the connecting ring; and a handling rein having forward ends individually connected to the lower end portions of the arms.

2. In a bridle for an animal including a headstall adapted for attachment to the animal's head including a nose strap adapted to extend over the animal's nose and having opposite ends adapted to lie on opposite sides of the nose, an animal controlling apparatus comprising eyelets connected to the ends of the nose strap, a substantially U-shaped upwardly disposed hanger having upper hooks individually loosely connected to the eyelets and an intermediate, substantially straight, rigid, lower journal portion adapted to extend transversely in spaced relation beneath the animal's chin; a bearing sleeve rotatably received on the journal portion of the hanger and having upwardly and downwardly disposed and forwardly and rearwardly disposed portions; a pair of elongated arcuate lever arms having angularly related upper and lower end portions and being rigidly connected in juxtaposition intermediate said end portions to the upwardly disposed portion of the sleeve so that the upper end portions are rearwardly divergent from the sleeve and so that the lower end portions are downwardly and slightly rearwardly divergent from the sleeve; an elongated, longitudinally upwardly concave chin bar adapted to extend transversely beneath the animal's chin having upwardly extended opposite outer ends and being rigidly connected intermediate said ends to the upper end portions of the arms, the arms being swingable on said journal portion incident to application and release of rearward pressure on said lower end portions of the arms between a position with the chin bar in engagement with the animal's chin and a position retracted therefrom; and a handling rein having forward ends individually connected to the lower end portions of the arms.

3. In a bridle for an animal including a headstall adapted for attachment to the animal's head including a nose strap adapted to extend over the animal's nose and having opposite ends adapted to lie on opposite sides of the nose, an animal controlling apparatus comprising eyelets connected to the ends of the nose strap, a substantially U-shaped upwardly disposed hanger having elongated rigid end portions terminating in upper hooks individually loosely connected to the eyelets and an intermediate substantially straight, rigid, lower journal portion interconnecting the end portions in downwardly spaced relation to the hooks and adapted to extend in substantially horizontal position transversely in spaced relation beneath the animal's chin; a rigid bearing sleeve of approximately the same length as and rotatably received on the journal portion of the hanger having opposite ends individually engageable with the end portions of the hanger, the sleeve also having upwardly and downwardly disposed and forwardly and rearwardly disposed portions; a pair of elongated arcuate lever arms having upper and lower end portions and being rigidly connected in juxtaposition intermediate said end portions to the sleeve, the upper end portions of the arms being upwardly divergently extended away from the sleeve and the lower end portions of the arms being downwardly divergently extended from the sleeve; an elongated, longitudinally upwardly concave chin bar adapted to extend transversely beneath the chin of the animal having upwardly extended opposite outer ends and being rigidly connected intermediate said ends to the upper end portions of the arms, the arms being swingable on said journal portion incident to application and release of rearward pressure on said lower end portions of the arms between a position with the chin bar in engagement with the animal's chin and a position downwardly retracted therefrom; and a handling rein having forward ends individually connected to the lower end portions of the arms.

References Cited in the file of this patent
UNITED STATES PATENTS

| | | |
|---|---|---|
| 2,471,121 | Reed | May 24, 1949 |
| 2,625,780 | Flatt | Jan. 20, 1953 |
| 2,630,660 | Thomas | Mar. 10, 1953 |
| 2,669,816 | Pletsch | Feb. 23, 1954 |
| 2,804,740 | Newman | Sept. 3, 1957 |